United States Patent
Su

(10) Patent No.: US 7,239,672 B2
(45) Date of Patent: Jul. 3, 2007

(54) CHANNEL ESTIMATOR FOR WLAN

(75) Inventor: Hsiao-Lan Su, Pingtung (TW)

(73) Assignee: Silicon Integrated Systems Corp., Hsin Chu (TW)

(*) Notice: Subject to any disclaimer, the term of this patent is extended or adjusted under 35 U.S.C. 154(b) by 612 days.

(21) Appl. No.: 10/234,519

(22) Filed: Sep. 5, 2002

(65) Prior Publication Data

US 2004/0047435 A1 Mar. 11, 2004

(51) Int. Cl.
*H04L 27/00* (2006.01)
(52) U.S. Cl. ............ 375/316; 375/295; 455/63.1; 455/67.13
(58) Field of Classification Search ........... 375/219, 375/295, 316, 346, 232, 240.02; 700/28

See application file for complete search history.

(56) References Cited

U.S. PATENT DOCUMENTS

| 5,353,307 | A  | * | 10/1994 | Lester et al. ............. 375/233 |
| 5,838,728 | A  | * | 11/1998 | Alamouti et al. .......... 375/265 |
| 6,275,525 | B1 | * | 8/2001  | Bahai et al. ............. 375/232 |
| 2002/0122471 | A1 | * | 9/2002 | Ling ..................... 375/147 |
| 2003/0210733 | A1 | * | 11/2003 | Cervini .................. 375/147 |
| 2003/0235147 | A1 | * | 12/2003 | Walton et al. ............ 370/204 |

* cited by examiner

*Primary Examiner*—David C. Payne
*Assistant Examiner*—Aslan Ettehadieh
(74) *Attorney, Agent, or Firm*—Troxell Law Office, PLLC

(57) ABSTRACT

A channel estimator for use in wireless local area networks (WLAN's), characterized in that a channel estimation controller with a simplified recursive least square (RLS) algorithm and a data-reconstructor are employed to adjust the channel response in frequency domain during the delivery of a signal packet. Such adjustment is adaptively performed at anytime during the delivery of a signal packet so as to achieve fast convergence as well as accurate channel estimation.

13 Claims, 3 Drawing Sheets

Channel Estimator

CHANNEL ESTIMATOR FOR WLAN

BACKGROUND OF THE INVENTION

1. Field of the Invention

The present invention generally relates to a channel estimator for a wireless local area network (WLAN) and, more particularly to a channel estimator characterized in that adjustment in channel estimation is adaptively performed at anytime during the delivery of a signal packet so as to achieve fast convergence as well as accurate channel estimation.

2. Description of the Prior Art

Recently, wireless local area networks (WLAN's) have been widely studied, discussed and developed. In OFDM (Orthogonal Frequency Division Multiplexing)-based WLAN technology, channel estimation has become one of the most important issues. To date, short and long preambles are used in most channel estimation applications. The short and long preambles are usually disposed at the front end of a transmitted packet. However, after the packet is transmitted in the WLAN for a period of time, the channel for signal transmission varies with time and/or space. Therefore, channel estimation by using the preambles is not sufficient for the rest of the data in the transmitted packet after the channel has varied.

Meanwhile, channel estimation results in error signals that adversely affect the accuracy in data demodulation without adjustment in channel estimation, thereby causing serious demodulation errors.

SUMMARY OF THE INVENTION

It is a primary object of the present invention to provide a channel estimator so as to overcome the aforementioned drawback. Thus, the channel estimation according to the present invention employs a simplified recursive least square (RLS) algorithm and data-reconstruction to adjust the channel response in frequency domain during the delivery of a signal packet. Such adjustment is adaptively performed at anytime during the delivery of a signal packet so as to achieve fast convergence as well as accurate channel estimation.

In order to achieve the foregoing object, the present invention provides an improved multi-purpose disc, comprising: a channel corrector, for correcting and compensating the channel effect; an adaptive channel estimator, connected to said channel corrector so as to perform adaptive channel estimation; a symbol buffer, connected to said channel corrector so as to store the symbols of a transmitted signal; a data reconstructor, connected to said channel estimator so as to reconstructs the data of a feedback signal; and a channel estimation controller, connected to said adaptive channel estimator, said symbol buffer and said data reconstructor so as to control channel estimation.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits and advantages of the preferred embodiment of the present invention will be readily understood by the accompanying drawings and detailed descriptions, wherein.

DETAILED DESCRIPTION OF THE INVENTION

The present invention providing a channel estimator for use in wireless local area network (WLAN), characterized in that a channel estimation controller with a simplified recursive least square (RLS) algorithm and a data-reconstructor are employed to adjust the channel response in frequency domain during the delivery of a signal packet, can be exemplified by the preferred embodiment as described hereinafter. Such adjustment is adaptively performed at anytime during the delivery of a signal packet so as to achieve fast convergence as well as accurate channel estimation.

Figure 1:
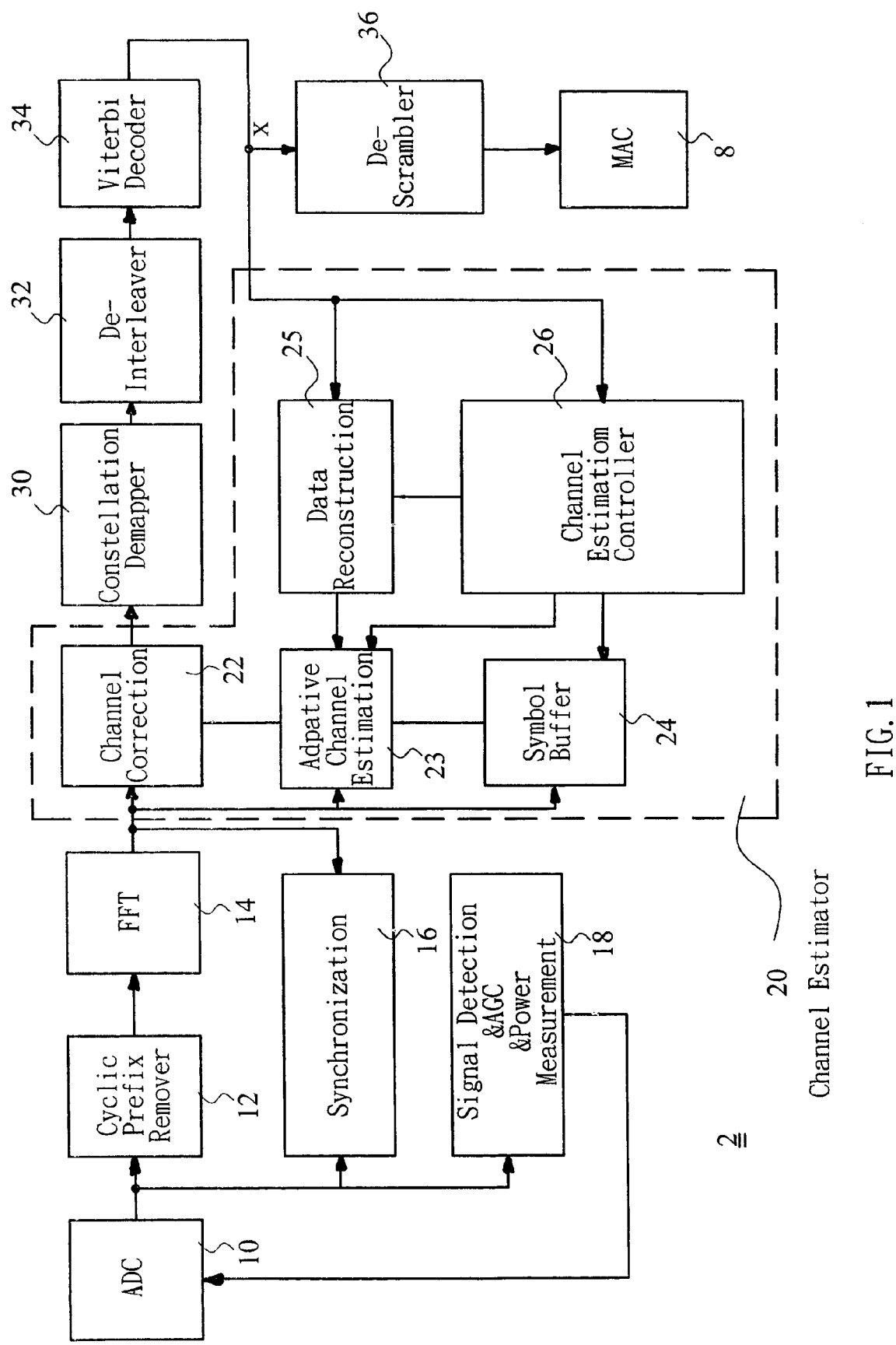
FIG. 1 is a block circuit diagram showing a channel estimator disposed in a WLAN receiver in accordance with one embodiment of the present invention.

To start with, a channel estimator 20 for use in WLAN's is described as shown in FIG. 1, which is a block circuit diagram showing a channel estimator 1 disposed in a WLAN receiver 2 in accordance with one embodiment of the present invention. In FIG. 1, when a WLAN receiver 2 receives an analog signal, the analog signal is converted into a digital signal by an analog-to-digital converter (ADC) 10. Then, the digital signal is transmitted into a cyclic prefix remover 12, a synchronizer 16, and a device for signal detection, automatic gain control (AGC) and power measurement 18. An output terminal of the cyclic prefix remover 12 is connected to a Fast Fourier Transformer (FFT) 14 so as to transform a time-domain signal into a frequency-domain signal. An output terminal of the device for signal detection, AGC and power measurement 18 is connected to the ADC 10 so as to control the operation of the ADC 10. On the one hand, the output frequency-domain signal from the FFT 14 is transmitted to the synchronizer 16 for synchronization; on the other hand, the output frequency-domain signal is transmitted to the channel estimator 20.

According to the present invention, the channel estimator 20 comprises a channel corrector 22 so as to correct and compensate the channel effect. An input terminal of the channel corrector 22 (i.e., an input terminal of the channel estimator 20) is connected to the FFT 14. An output terminal of the channel corrector 22 (i.e., an output terminal of the channel estimator 20) is connected to a constellation demapper 30. The channel estimator 20 also comprises an adaptive channel estimator 23 for adaptive channel estimation performed at anytime during the delivery of a signal packet. An input terminal of the adaptive channel estimator 23 receives the frequency-domain signal output from the FFT 14, while an output terminal is connected to the channel corrector 22 so as to compensate the channel effect. The channel estimator 20 further comprises a symbol buffer 24 so as to store the symbols of the transmitted signal. An input terminal of the symbol buffer 24 is also connected to the FFT 14 and receives the frequency-domain signal output from the FFT 14, while an output terminal of the symbol buffer 24 is connected to the adaptive channel estimator 23.

In FIG. 1, the channel estimator 20 further comprises a data reconstructor 25 and a channel estimation controller 26. An input terminal of the data reconstructor 25 is another input terminal of the channel estimator 20, while an output terminal of the data reconstructor 25 is connected to the adaptive channel estimator 23. The data reconstructor 25 reconstructs the data of a feedback signal. More particularly, the feedback signal into the data reconstructor 25 according to the present invention is output at a node X from an output terminal of a Viterbi Decoder 34. Therefore, the accuracy as well as the reliability of channel estimation is improved. Moreover, for the channel estimation controller 26, an input terminal is connected to an input terminal of the data reconstructor 25. In other words, the feedback signal is output from the Viterbi Decoder 34 at the node X. An output terminal of the channel estimation controller 26 is connected the adaptive channel estimator 23, the symbol buffer 24 and the data reconstructor 25 so as to control channel estimation, in which a simplified recursive least square (RLS) algorithm is employed to complete the operation. Then, the output terminal of the channel estimator 20, as a whole, is transmitted through the channel corrector 22 to a constellation demapper 30.

The constellation demapper 30 performs constellation demapping on the signal transmitted from the channel estimator 20. An output is then coupled to a de-interleaver 32 so as to de-interleave the signal. An output terminal of the de-interleaver 32 is donnected to a Viterbi decoder 34 so as to decode the signal. The decoded signal is then transmitted to the node X, which provides the channel estimator 20 with a feedback signal. Also, the decoded signal is coupled to a de-scrambler 36. An output terminal of the de-scrambler 36 is then connected to a media access controller (MAC) 8. Therefore, a WLAN receiver 2 composed of a channel estimator according to the present invention is completed.

As mentioned above, the operation of channel estimation is completed by using a simplified recursive least square (RLS) algorithm. Generally, the conventional recursive least square (RLS) equation is expressed as:

$$Q_{p+1}=Q_p+(1-w)(Y_p-Q_p\hat{Y}_p)\hat{Y}_p^* \quad (1)$$

wherein, $Q_p$ denotes a reference value of the present state for adjustment in channel estimation while $Q_{p+1}$ denotes a reference value of the next state for adjustment in channel estimation; w denotes a coefficient for adjustment calculation; $Y_p$ denotes an equalized input signal; $\hat{Y}_p$ denotes an equalized output signal of a decision mode; and $\hat{Y}_p^*$ denotes the complex conjugate of the $\hat{Y}_p$. However, Eq (1) adds complexity to the recursive calculation. On the other hand, the present discloses an improved recursive least square (RLS) equation expressed as:

$$Q_{p+1} = K\frac{\hat{Y}_p^*}{|\hat{Y}_p|^2}Y_p + (1-K)Q_p \quad (2)$$

wherein, K denotes an optimal solution between 0 and 1 (0<K<1), particularly, $K=(1-w)|\hat{Y}_p|^2$. Therefore, the RLS equation according to the present invention can be regarded as a recursion calculation on linear calculations based on $Y_p=X_pH_p$, wherein $X_p$ is set as $\hat{Y}_p$ and $H_p$ set as $Q_p$. In other words, Eq (2) simplifies the recursion calculation so as to achieve fast convergence as well as accurate channel estimation.

Here, it is noted that the operating method of the channel estimation controller 26 according to the present invention can be completed by executing computer software based on the aforementioned RLS algorithm. Moreover, channel estimation can also be controlled by using hardware circuits. In other words, the implementation of the channel estimator 26 according to the present invention can be completed by using software programs and/or hardware circuitry.

Figure 2:
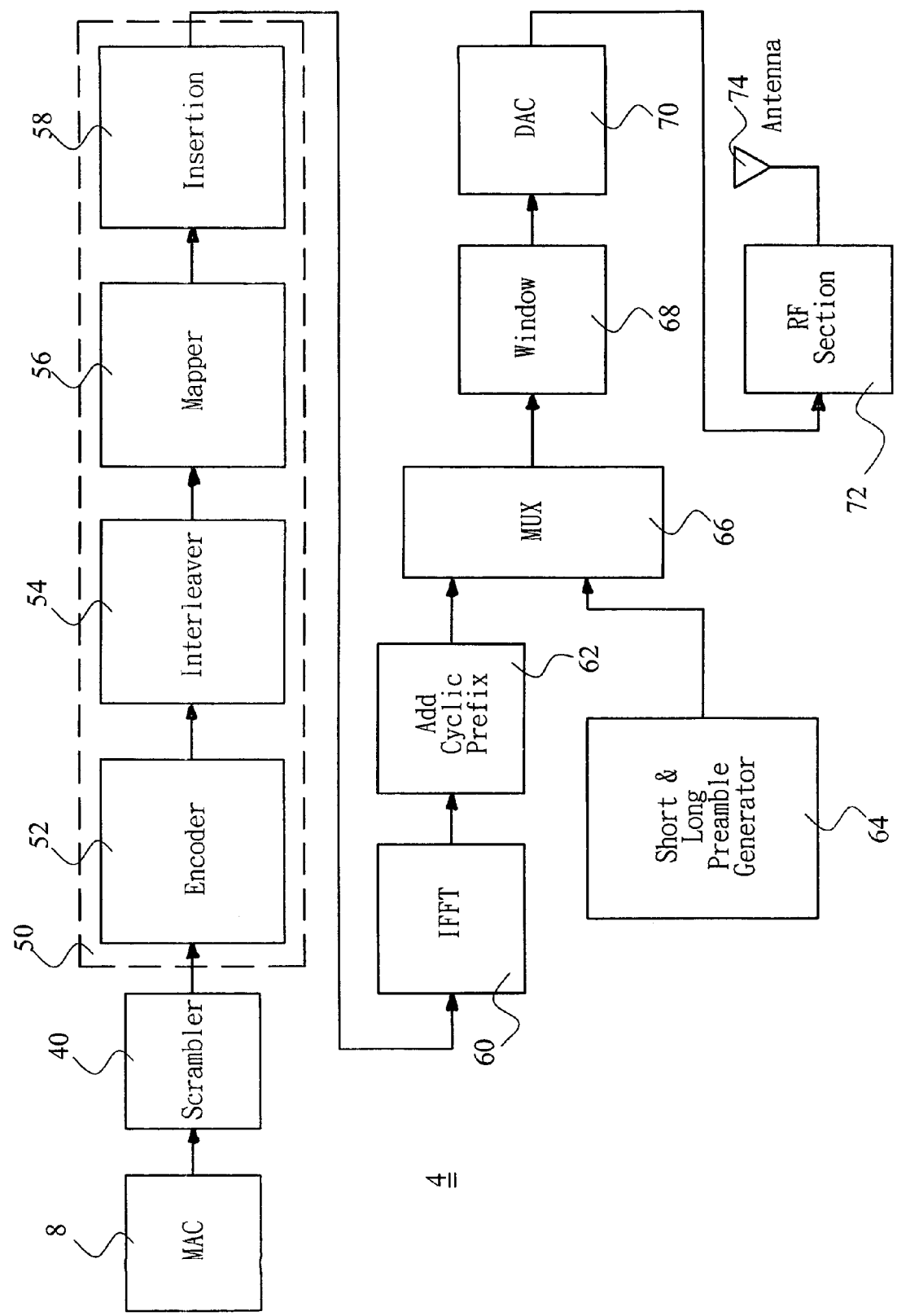
FIG. 2 is a block circuit diagram showing a data reconstructor disposed in a channel estimator, wherein the data reconstructor is established by using the same circuitry of a signal generator in a WLAN transmitter, in accordance with one embodiment of the present invention.

The data reconstructor 25 in the channel estimator 20 according to the present invention is established with a signal generator 50 in a WLAN transmitter 4, as shown in FIG. 2. In a WLAN transmitter 4, the signal to be transmitted is accessed by a media access controller (MAC) 8 and then is scrambled by a scrambler 40. The scrambled signal is then transmitted into the signal generator 50 and modulated by an Inverting Fast Fourier Transformer (IFFT) 60. The data reconstructor 25 of the channel estimator 20 according to the present invention is established by using the same circuitry of a signal generator 50 in a WLAN transmitter 4 so as to reduce the fabrication cost.

The signal generator 50 in FIG. 2 comprises: a encoder 52, having an input terminal of the encoder 52 as an input terminal of the signal generator 50 so as to receive an input signal to be encoded, wherein said received signal is an output signal scrambled by a scramble 40; an interleaver 54, connected to the encoder 52 so as to interleave the encoded signal; a mapper 56, connected to the interleaver 54, so as to map the interleaved signal onto a mapping distribution; and a inserter 58, connected to the mapper 56, so as to insert the mapped signal into a pilot signal. On implementation, the encoder 52 is a convolutional encoder; the interleaver 54 is a block interleaver 54; the mapper 56 is a constellation mapper such that the mapping distribution is a constellation distribution; and the inserter 58 is pilot tone inserter and the inserted signal is a pilot signal.

Moreover, an output terminal of the signal generator 50 is connected to an Inverting Fast Fourier Transformer (IFFT) 60 so as to perform IFFT on the signal. The transformed signal is coupled to a cyclic prefix adder 62 so as to add cyclic prefix to the transmitted signal to be transmitted to a MUX 66. The other input terminal of the MUX 66 is connected to a short and long preamble generator 64 so as to add the cyclic prefix and the short and long preambles to the front end of the packet. The signal with added short and long preambles is processed by a window 68 to shape the signal. Then, the signal is transmitted to a digital-to-analog converter (DAC) 70 so as to convert the digital signal into an analog signal. Finally, the signal is modulated by a RF section 72 and transmitted by an antenna 74.

Figure 3:
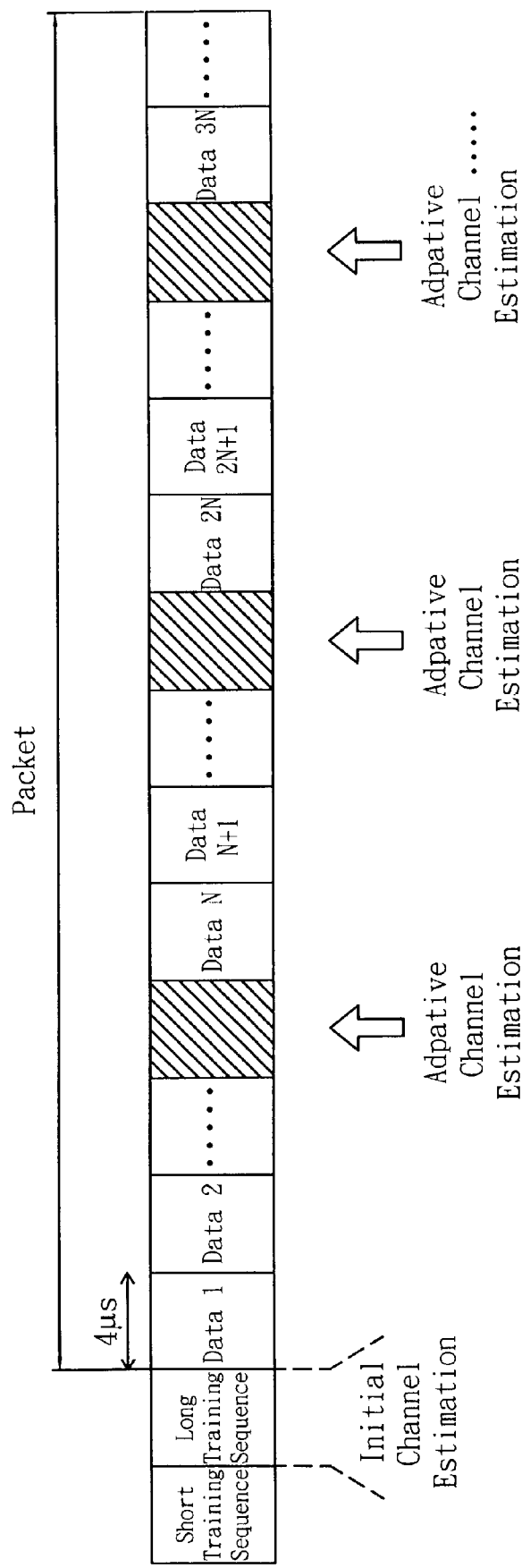
FIG. 3 is a schematic diagram showing the operation of a channel estimator, wherein adaptive adjustment is performed at anytime during the delivery of a signal packet, in accordance with one embodiment of the present invention.

Furthermore, the adjustment procedure according to the present invention is characterized in that channel response in frequency domain is flexibly adjusted at anytime during the delivery of a signal packet so as to achieve adaptively adjustment. With reference to FIG. 3, initial channel estimation is performed at the long preamble of a transmitted packet. Then, at anytime in the packet, such as the time before N, 2N and 3N, adjustment in channel estimation is adaptively performed, wherein N is an arbitrary integer. Accordingly, adaptive adjustment in channel estimation performed in the transmitted packet in the channel estimator 20 of the present invention is far better than the fixed adjustment in channel estimation performed only in the preambles in the prior art. Therefore, the present invention is advantageous over the prior art for the prevention from error estimation.

The present invention employs a simplified recursive least square (RLS) algorithm and a data-reconstructor are employed to adjust the channel response in frequency domain during the delivery of a signal packet. Such adjustment is adaptively performed at anytime during the delivery of a signal packet so as to achieve fast convergence as well as accurate channel estimation. Accordingly, the advantages of the present invention can be summarized as:

1) data reconstruction is implemented by using the same hard circuitry of a signal generator in a WLAN transmitter so as to reduce the fabrication cost;

2) the channel estimation controller can be implemented by employing software programs based on a simplified recursive least square (RLS) algorithm and/or hardware circuitry; and 3) adaptive adjustment in channel estimation is flexibly performed at anytime during the delivery of a signal packet.

According to the above discussion, the present invention discloses a channel estimator for use in a wireless local area network (WLAN) characterized in that adjustment in channel estimation is adaptively performed at anytime during the delivery of a signal packet so as to achieve fast convergence as well as accurate channel estimation. Therefore, the present invention has been examined to be progressive, advantageous and applicable to the industry.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A channel estimator for a wireless local area network (WLAN), comprising:
    a channel corrector, wherein an input terminal of said channel corrector is an input terminal of said channel estimator, and an output terminal of said channel corrector is an output terminal of said channel estimator so as to correct and compensate the channel effect;
    an adaptive channel estimator, wherein an input terminal of said adaptive channel estimator is connected to said input terminal of said channel corrector, and an output terminal of said adaptive channel estimator is connected to said channel corrector so as to perform adaptive channel estimation;
    a symbol buffer, wherein an input terminal of said symbol buffer is connected to said input terminal of said channel corrector, and an output terminal of said symbol buffer is connected to said adaptive channel estimator as to store the symbols of a transmitted signal;
    a data reconstructor, wherein an input terminal of said data reconstructor is another input terminal of said channel estimator, and an output terminal of said data reconstructor is connected to said adaptive channel estimator so as to reconstructs the data of a feedback signal; and
    a channel estimation controller, wherein an input terminal of said channel estimation controller is connected to said input terminal of said data reconstructor, and an output terminal of said channel estimation controller is connected to said adaptive channel estimator, said symbol buffer and said data reconstructor so as to control channel estimation, wherein said adaptive channel estimator flexibly performs adjustment in channel estimation during packet transmission so as to adapt channel variation and controlling of said channel estimation controller is implemented by using a simplified recursive least square (RLS) algorithm so as to perform channel estimation, wherein said simplified recursive least square (RLS) algorithm is represented by the equation:

$$Q_{p+1} = K \frac{\hat{Y}_p^*}{|\hat{Y}_p|^2} Y_p + (1-K)Q_p$$

wherein Qp is a reference value of the present state for adjustment in channel estimation, p is a symbolic number with Qp+1 being a reference value of the next state for adjustment in channel estimation at p+1, K is an optimal solution between 0 and 1, Yp is an equalized input signal, Yp(hat) is an equalized output of a decision mode, and Yp(hat)* is a complex conjugate of Yp(hat).

2. The channel estimator for a wireless local area network (WLAN) as recited in claim 1, having said channel estimator disposed in a WLAN receiver, wherein said input terminal of said channel estimator is connected to an output terminal of a fast Fourier transformer (FFT) in said WLAN receiver.

3. The channel estimator for a wireless local area network (WLAN) as recited in claim 1, having said channel estimator disposed in a WLAN receiver, wherein said input terminal of said data reconstructor is connected to an output terminal of a decoder in said WLAN receiver.

4. The channel estimator for a wireless local area network (WLAN) as recited in claim 3, wherein said decoder is a Viterbi decoder.

5. The channel estimator for a wireless local area network (WLAN) as recited in claim 1, having said channel estimator disposed in a WLAN receiver, wherein said output terminal of said channel estimator is connected to an input terminal of a constellation demapper in said WLAN receiver.

6. The channel estimator for a wireless local area network (WLAN) as recited in claim 1, wherein said channel estimator is implemented by using software programs.

7. The channel estimator for a wireless local area network (WLAN) as recited in claim 1, wherein said channel estimator is implemented by using hardware circuitry.

8. The channel estimator for a wireless local area network (WLAN) as recited in claim 1, wherein data reconstruction of said data reconstructor is implemented by the same hardware circuitry of a signal generator in a WLAN transmitter.

9. The channel estimator for a wireless local area network (WLAN) as recited in claim 8, wherein said signal generator comprises:
    a encoder, having an input terminal of said encoder as an input terminal of said signal generator so as to receive an input signal to be encoded;
    an interleaver, connected to said encoder so as to interleave said encoded signal;
    a mapper, connected to said interleaver so as to map said interleaved signal onto a mapping distribution; and
    an inserter, connected to said mapper so as to insert said mapped signal into a pilot signal.

10. The channel estimator for a wireless local area network (WLAN) as recited in claim 9, wherein said encoder is a convolutional encoder.

11. The channel estimator for a wireless local area network (WLAN) as recited in claim 9, wherein said interleaver is a block interleaver.

12. The channel estimator for a wireless local area network (WLAN) as recited in claim 9, wherein said mapper is a constellation mapper such that the mapping distribution is a constellation distribution.

13. The channel estimator for a wireless local area network (WLAN) as recited in claim 9, wherein said inserter is a pilot tone inserter and said inserted signal is a pilot signal.

* * * * *